Oct. 9, 1945.  E. G. DOKE  2,386,386
LIGHT GAUGE SECURING CLIP
Filed Aug. 8, 1941  2 Sheets-Sheet 2
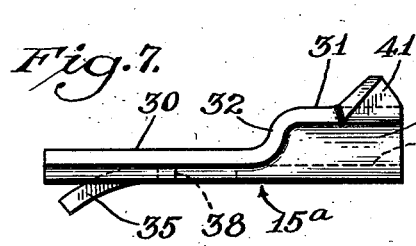
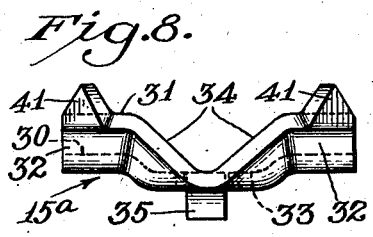
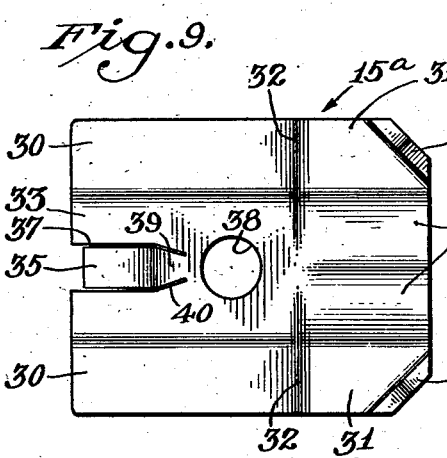
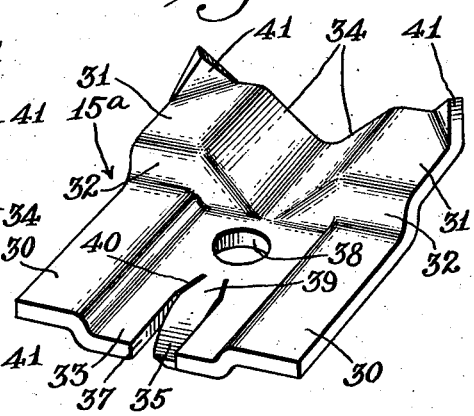
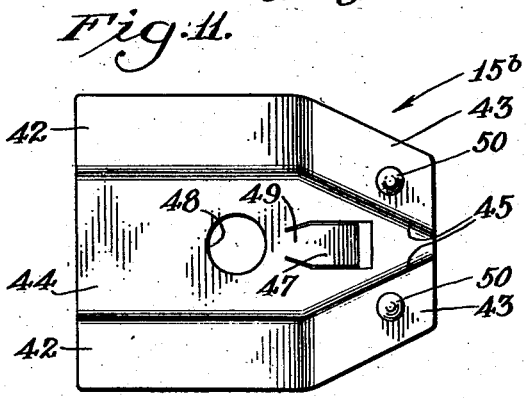
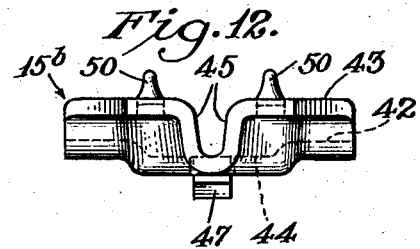
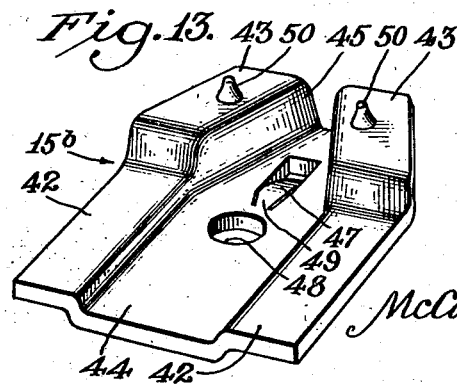
Inventor
Ernest G. Doke
By
McCaleb, Wendt & Dickinson
Attorneys.

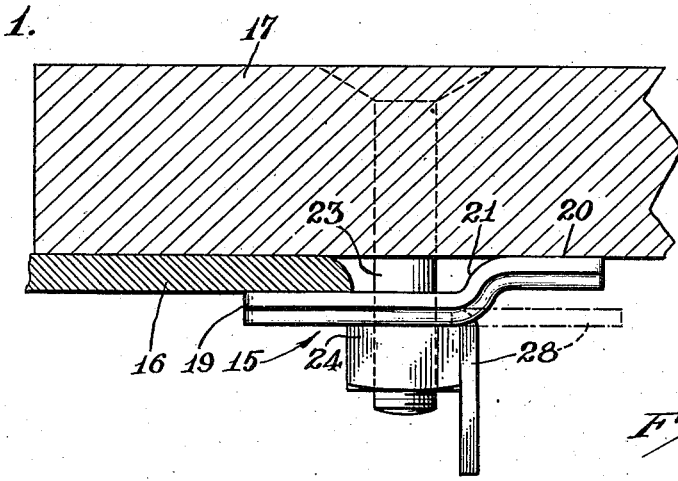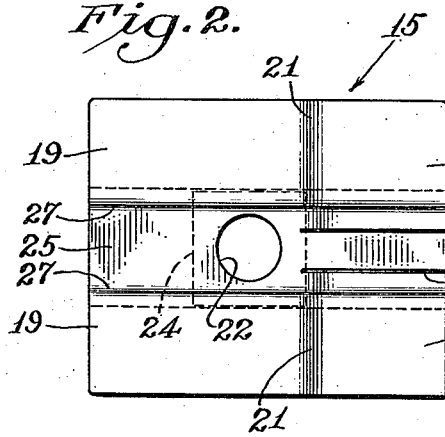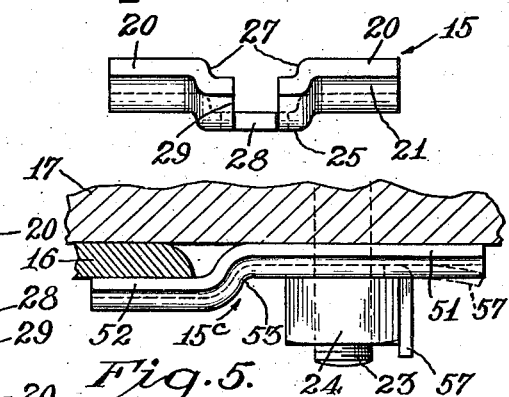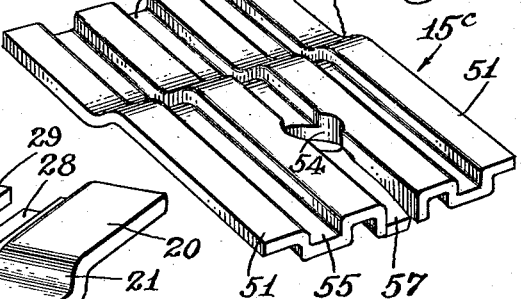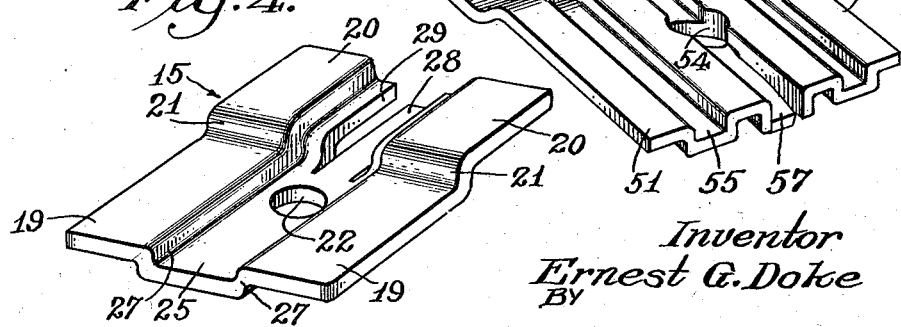

Patented Oct. 9, 1945

2,386,386

UNITED STATES PATENT OFFICE 2,386,386

LIGHT GAUGE SECURING CLIP

Ernest G. Doke, Chicago, Ill., assignor to Mac-Lean-Fogg Lock Nut Company, Chicago, Ill., a corporation of Illinois Application August 8, 1941, Serial No. 405,975

7 Claims. (Cl. 189—35)

This invention relates to securing clips and more particularly to clips of the type which may be used in securing together members which overlap in offset relation as, for example, the floor boards and their supporting sills in railway car floors.

Clips of this nature have usually been stamped from a reasonably easy working sheet metal stock, such as mild steel, the gauge of which, proportional to the stresses and strains which the clips are required to withstand in use, has necessarily been relatively heavy and thus of substantial weight in relation to the effective engagement or bearing area of the clips.

Such clips may be equipped with integral nut-locking means consisting of portions severed from the body of the respective clips and arranged to be bent into engagement with a face of the tightened nut of the fastening bolt to prevent unintentional loosening of the nut. From time to time, it may be necessary to loosen or remove the clip to adjust or replace the members secured thereby and this necessitates bending the nut-lock back into non-locking position. In railway car floors, the locking and unlocking operations may take place as many as ten or more times in the life of a clip, as it becomes necessary to take up shrinkage slack in the floor boards or make repairs of one sort or another.

Due to the thickness of the clip stock, various expedients have been resorted to for reducing the resistance to bending of the nut-locks such, for example, as forming the same from an integral section of reduced thickness on the clip body. Where the thickness of the nut-lock at the point of bending is such as to offer substantial resistance to bending, not only is more effort and labor involved in manipulating the nut-lock, but the number of bendings which it can withstand is fairly limited.

All of these factors, of course, affect not only the initial cost of the clips as well as the labor costs in applying or removing the clips, but also the efficiency of the clips in their particular environment and the useful life of the clips under conditions such as mentioned.

An aim of the present invention is to provide a construction for the clips which permits the use of sheet metal stock of much reduced gauge compared with prior constructions, without loss of strength or efficiency.

Another object is to form the clips in such a manner as to attain greater strength and increased and better distribution of bearing areas than prior clips of comparable weight.

Still another object is to enable use of a full body-thickness portion of such a clip for the nut-lock and yet permit relatively easy bending of the nut-lock into and out of locking position.

A further object is to provide a novel securing clip of this character which may be efficiently and quickly formed by a simple stamping process from plain, relatively thin gauge and inexpensive sheet metal stock, which also is simple and easy to apply or remove so that labor costs are minimized and which has a long useful life even in circumstances requiring numerous removals or shiftings of the clip.

Other objects and advantages of the invention will be apparent from the following description of certain specific embodiments of the invention and the accompanying drawings showing the same, in which similar characters of reference indicate similar parts throughout the several views. In the drawings:

Fig. 1 is a fragmentary vertical sectional view taken through a railway car floor assembly showing one of my clips in side elevation;

Fig. 2 is a top plan view of the clip;

Fig. 3 is an end view of the clip looking toward the left, as shown in Fig. 2;

Fig. 4 is a top perspective view of the clip;

Fig. 5 is a fragmentary vertical sectional view through the floor assembly showing a modified form of my clip in side elevation;

Fig. 6 is a top perspective view of the modified clip shown in Fig. 5;

Fig. 7 is a side elevational view of another modified form of the clip;

Fig. 8 is a right end view of the clip shown in Fig. 7;

Fig. 9 is a top plan view of the clip of Fig. 7;

Fig. 10 is a top perspective view of the clip of Fig. 7;

Fig. 11 is a top plan view of a further modified form of the clip;

Fig. 12 is a right end view of the clip shown in Fig. 11; and

Fig. 13 is a top perspective view of the clip of Fig. 11.

By way of illustrating an important use for which a clip 15 (Figs. 1 to 4) embodying the features of the invention is adapted, I have shown a fragment of a railway car floor having, as the members to be secured together by the clip, a sill 16 and a flood board 17. The sill 16 as illustrated is in the form of a lateral horizontal flange of a standard angular metal shape forming one side of the floor frame structure. An end portion of the floor board 17 rests upon the sill 16 in overlapping, offset relation.

The clip 15 comprises an elongated body having a sill-engaging portion or flange 19 and a board-engaging portion or flange 20. These flanges are connected together by integral means such as an offsetting wall or connecting bend 21 in offset relation to one another substantially proportionate to the offset relationship of the engaged surfaces of the sill and floor board. Because of its sharp angularity, the connecting bend 21 provides a line of substantial reenforcement transversely of the clip.

One of the flanges of the clip, in this instance the sill-engaging flange 19, has an aperture 22 adjacent to, but spaced from, the bend 21 for receiving the shank of a fastening bolt 23 which is carried by and extends downwardly from the floor board 17 close to the edge of the sill 16. A nut 24 is threaded on the lower end of the bolt 23 and draws the clip up tight against the floor board and the sill. Since the bolt-engaged section of the flange 19 is at about the center of the clip and provides a bridge between the bend 21 and the edge of the sill 16, the thrust of the bolt is well distributed to both flanges of the clip.

The flanges 19 and 20 may be initially slightly toed in. Thus, when the flanges are drawn up flat against the sill and the floor board, the flanges are placed under enough tension by flexure at the bridge of the clip to take up a reasonable amount of slack that may develop subsequent to installation of the floor. This feature, as well as the bridge nature of the portion of the clip engaged by the fastening bolt, adapts the clip for use with sills of different thicknesses within certain limits.

An important feature of the invention is the construction of the clip which permits the use of thinner gauge sheet metal stock. To this end, the relatively thin sheet metal body of the clip may be embossed or ribbed for reenforcement. In the clip 15, a medial reenforcing rib 25 of channel-shape cross-section extends longitudinally of the clip through both the sill-engaging and the board-engaging flanges 19 and 20. The width of the rib is preferably such as to provide a full bearing surface for the thrust face of the nut 24, and the connecting means or side walls of the rib, identified by the numeral 27, are preferably located in line with the thrust face of the tightened nut.

It will thus be seen that the reenforcing rib 25 so strengthens the clip structure that it will stand up sturdily and dependably under hard usage, even though the body of the clip is made from a gauge of sheet metal which in flat condition might not adequately withstand the strains to which it must submit. These strains are particularly severe in a railway car floor because of the tendency at times of the sill 16 and floor board 17 to move relatively due to the twisting or movement of the car floor resulting from such factors as uneven distribution of the car load, swaying and distortion of the car while traveling over uneven roadbeds, and the like. The reenforced clip 15 may, however, be made for such use from sheet metal as thin as 11-gauge (U. S. standard) or about one-eighth inch, or even thinner with same steels, as compared with 3-gauge (U. S. standard) or one-quarter inch or thicker material required for clips with unreenforced flanges.

A distinct advantage resulting from the rib-reenforced construction of the clip, is that although the clip may be provided with engagement areas at the opposite sides of the rib 25 equivalent to or even greater than the engagement areas of comparable clips formed of flat, heavier gauge stock, there is a substantial reduction in weight due to the smaller gross amount of material required for each clip. This reduction in per unit weight may amount to as much as one-third. Since metal costs are an important factor in determining the sales price of the clips, it will be appreciated that the present clip effects a substantial saving in cost. In addition, there is the advantage of weight reduction in a structure such as a railway car where weight reduction is an important desideratum.

Another advantage of the invention accrues as a result of the wider and better distribution of the engagement areas of the clip with respect to the faces of the sill 16 and the floor board 17 due to the medial separation and lateral spacing of these areas by the rib 25. Thus, instead of the flanges of the clip engaging the sill 16 and the floor board 17 at single, relatively narrow portions of their faces, as in prior clips, the flanges of clip 15 engage them at laterally spaced portions. For example, where a prior clip may have presented a flange surface in a single width of one and one-half inches, the present clip may present lateral wing sections of three-quarter inch each spaced apart by the width of the rib 25. Although the total engagement areas of the clip flanges 19 and 20 may be the same as in the prior clips, the over-all lateral effectiveness of the flanges is substantially increased and the clip maintains a steadier hold upon the engaged members. In fact, it is possible to secure an increased lateral spread of the wing sections or bearing areas of the clip, and thus even firmer bearing engagement, by increasing their width substantially over prior heavier gauge clips and yet remain within substantially the established or permissible weight limits.

Because of the relatively thin gauge of the stock from which the clip 15 is made, a bendable nut-lock in the form of a narrow tongue 28 may be provided without requiring reduction in thickness of the stock in order to permit quick and easy bending of the tongue into locking position against one face of the tightened nut 24. As shown, the tongue 28 is severed, by means of spaced parallel slits 29, from the longitudinal center of the rib 25 where the rib extends across the flange 20. The locking tongue 28 might also be severed from the section of the rib which extends across the flange 19. If preferred, of course, some other form of nut-locking device may be used instead of the tongue 28.

The slits 29 extend from the end of the clip inwardly to terminate adjacent and preferably under the nut 24 when the latter is in tightened position so that the tongue 28 may be bent substantially flat against the adjacent face of the nut.

As seen in Figs. 1 and 3, the tongue 28 may, before it is bent into locking position, lie in substantially the plane of the sill flange portion of the rib 25, so that there is substantial clearance between the tongue and the under surface of the flange 20 to facilitate engagement of the tongue by means of a suitable bending tool. By preference, the tongue 28 actually projects slightly beyond the board-engaging end of the clip, as shown in dot-dash outline in Fig. 1 and full outline in Fig. 2, and thus additionally facilitates the bending engagement.

In the modified form of the clip shown in Figs. 7 to 10, inclusive, identified by the numeral 15a, a substantially more rigid construction is attained, especially in the board-engaging portion thereof, by increasing the reenforcement of such portion. In this form of clip, similarly as in the clip 15, the body of the clip is stamped from an elongated relatively thin sheet metal blank to provide a sill-engaging flange 30 and a board-engaging flange 31 in appropriately offset planes and connected by an off-setting wall or shoulder 32. A relatively wide medial reenforcing rib 33 extends longitudinally of the clip. In the sill-flange portion thereof, the rib 33 is fairly shallow, but in the board-flange portion rather deep and of increased strength, the central longitudinal wall area of the rib throughout its length preferably lying in a common plane. Thus, the portion of the rib which extends across the flange 31 is of substantially greater depth than in the clip 15 and provides connecting walls 34 of substantially greater width and definite angularity relative to the lateral bearing wing sections of the flange 31. In the present instance, the walls 34 converge in substantially V-shape at the base of the rib. As a result, the strength of the flange 31 is improved longitudinally.

An integral nut-locking tongue 35 may be formed on the clip 15a by severing from the rib 33 a narrow section inwardly from the end of the sill flange 30 by means of spaced parallel slits 37 extending in alinement with a bolt aperture 38. Because of the tool clearance afforded by the downwardly offset character of the base of the rib 33 relative to the sill-engaging wing portions of the flange 30, it is hardly necessary to initially form the tongue 35 away from the body of the clip to enable bending engagement of the tongue, even though the end of the tongue is shown as slightly curved down.

In order to attain even greater yieldability of the tongue 35 at the point of bending than afforded by the thin gauge of the metal stock, the transverse section of the tongue may be reduced as indicated at 39 by toeing in the inner ends of the slits 37, as at 40.

Rotation of the clip about the axis of its fastening bolt may be prevented by means such as prongs 41 extending up from the board flange 31 to penetrate the associated floor board. In the present instance, the prongs 41 are formed integrally with the flange 31 by bending up the relatively sharp outer corner portions of the wing sections of this flange. It is possible, of course, to make the clip non-turning without the prongs 41, by increasing the length of the sill-engaging flange 30 so that it will extend into engagement with an abutment on the sill member, such as provided by the web of the sill.

For some purposes, the reinforced construction of the modified form of clip identified by 15b, in Figs. 11, 12 and 13, may be preferred. In this clip, offset sill-engaging and board-engaging portions or flanges 42 and 43 are provided which are longitudinally deformed by a median reenforcing rib 44 which has its entire flat base area in a common plane. In the sill flange 42 the reenforcing rib 44 may be broad and shallow as in the described forms, but in the flange 43, the rib has side walls 45 which extend longitudinally toward convergence at their outer ends. Transversely the side walls extend substantially perpendicularly to the engagement wing sections of the flange 43. In providing this shape, the wing sections of the flange 43 may extend toward one another at their outer ends but without diminishing their effective board-engaging area.

A nut-lock in the form of a narrow tongue 47 may be severed out of the base portion of the rib 44 between the side walls 45 and in alinement with a bolt aperture 48. The forward end of the nut-lock 47 is severed short of the converging side walls 45, and the adjacent end of the rib 44 therefore remains solid and free from possible weakening as where the end edge of the clip is severed in the cutting out of the locking tongue. At its base end, the tongue 47 may, if desired, be reduced in transverse section as indicated at 49 in order to facilitate bending thereof.

Prongs 50 may be pressed directly from the material of the wing sections of the flange 43, for the purpose of engaging in the associated floor board and preventing turning of the clip relative to the associated fastening bolt.

Although the clips 15, 15a and 15b are of the bridge type (the bolt-engaged portion of the clip forming a bridge between the offsetting bend of the clip and the edge of the sill), the features of the invention are also applicable to the conventional type of clip where the fastening bolt engages the board-engaging flange of the clip and the offsetting bend of the clip approaches close to or abuts the edge of the floor sill. A clip 15c, having this general form, is shown in Figs. 5 and 6.

The clip 15c comprises a relatively long board-engaging flange 51 and a shorter sill-engaging flange 52 integrally connected in offset relation by a bend 53. The shank of the bolt 23, which is necessarily set substantially farther from the edge of the sill 16 in this instance than in Fig. 1, passes through an aperture 54 at approximately the center of the board-engaging flange 51 and the nut 24 bears against the area of the flange 51 adjacent the aperture.

Instead of having but a single relatively wide reenforcing rib, the clip 15c may be formed with a plurality of narrower, equally spaced longitudinal reenforcing ribs 55. Although the ribs 55 are shown as three in number and of substantially uniform channel shape throughout their length, the number, form and spacing of the ribs may, of course, be varied to accommodate various preferences or conditions. An advantage of the increased number and smaller size of the reenforcing ribs 55 is that a thinner metal stock may be used for the clip.

Since the center one of the ribs 55 extends medially of the clip, the bolt hole 54 passes through such rib, and the fastening nut 24, because of the narrow and closely spaced arrangement of the ribs, may engage the base portions or webs of all of the ribs. Should the nut be too small for this, a washer may be interposed between the nut and the opposing area of the clip.

If for any reason it is desirable that either or both of the flanges 51 and 52 be more strongly reenforced, the portions of any one or more of the ribs 55 therein may be deepened or otherwise modified for increased strength. The sill-engaging flange 52, in particular, may under some conditions be more effective if additionally reenforced because it is the shorter of the flanges and thus has less holding area, and because it is required to withstand lever strains to which the board-engaging flange 51 is not subjected.

An integral nut-locking tongue 57 may conveniently be severed from the board-flange portion of the center rib 55 as shown, with the base of the tongue joining the area of the clip adjacent the aperture 54 at a point inwardly of the spread of the nut 24. Initially, the locking tongue may be within the plane of the center rib web or may be slightly turned down at the end (broken outline of Fig. 5 and full outline of Fig. 6). A bending tool may conveniently be inserted in the rib clearance for engaging the tongue to bend the tongue into nut-locking position (Fig. 5).

The clips, and particularly the clips 15 and 15ᶜ, may conveniently be cut from respective rolled ribbed sections of the same widths as the finished clips, such sections being supplied in any lengths that may conveniently be handled. On the other hand, all forms of the clip are adapted to be formed as by stamping or pressing directly from flat sheet metal.

From the foregoing it will be apparent that the present invention provides an improved securing clip which may be constructed from sheet metal of substantially reduced gauge as compared with prior clips intended for similar uses. The simple and efficient reenforcing features of the invention not only reduce the weight of the clip, but also strengthen the structure and make possible an advantageous distribution of the effective bearing area of the clip. Where desirable, one portion of the clip may be more strongly reenforced than the remainder. Because of the thinner material that may thus be used for the body of the clip, the nut-locking member may be formed directly from the body of the clip without reduction in thickness and may yet be bent with great facility into or out of locking position. In addition, the clip may be formed economically by simple quantity production methods so that it may be produced at low cost.

While I have shown in the drawings, and have herein described in detail certain preferred embodiments, it is to be understood that I do not thereby intend to limit the invention to the specific forms disclosed but intend to cover all modifications and alternative constructions falling within the spirit and scope of the invention as expressed in the following claims.

I claim:

1. In combination in a securing clip of the character described, a pair of integrally connected flanges relatively offset in their major planes for engagement with the respective offset surfaces of a pair of members to be secured together, and a reenforcing rib extending through both of said flanges, the sides of said rib being wider in one of said flanges than in the other for increasing the reenforcement of said one flange.

2. In combination in a clip of the character described for securing together a pair of members having respective offset engageable surfaces, a pair of integrally connected offset flange portions for engaging the respective surfaces, and a reenforcing rib extending across both of said flange portions in offset relation to the surface-engaging faces of said portions and having its base lying in a common plane, whereby the rib is deeper in one of said portions and affords correspondingly greater reenforcement than in the other of said portions.

3. A clip as defined in claim 2 wherein the walls of the deeper portion of the reenforcing rib converge in substantially V-shape.

4. A clip as defined in claim 2 wherein the walls of the deeper portion of the reenforcing rib extend in generally converging relation toward the associated end edge of the clip.

5. A clip as defined in claim 2 wherein the reenforcing rib has a bolt aperture therethrough located substantially centrally of the clip.

6. A clip of the character described for securing together a pair of members having relatively offset engagement surfaces, integrally connected offset portions for engaging said surfaces, a reenforcing rib extending across both of said portions, and side walls connecting said rib to the remainder of the respective portions, the side walls of the rib in one of said portions extending in generally converging relation toward one edge of such portion.

7. In combination in a clip of the character described for securing together a pair of members having respective offset engageable surfaces, a pair of integrally connected offset flange portions for engaging the respective surfaces, and a reenforcing rib extending continuously across both of said flange portions and their integral connection in offset relation to the surface-engaging faces of said portions and having its base provided with a bolt hole spaced from said connection, the external surface of the rib base being plane for engagement with the thrust face of a nut cooperating with a bolt occupying the bolt hole, and said rib having side walls which lie parallel with each other on opposite sides of the bolt hole and are there spaced from each other a distance corresponding with the width of the nut thrust face.

ERNEST G. DOKE.